US008247944B2

(12) United States Patent
Gebregergis et al.

(10) Patent No.: US 8,247,944 B2
(45) Date of Patent: Aug. 21, 2012

(54) METHOD FOR REDUCING CURRENT AND TORQUE RIPPLE IN A BRUSHED ELECTRIC MOTOR AND MOTOR EMPLOYING THE SAME

(75) Inventors: Abraham G. Gebregergis, Saginaw, MI (US); Jeffrey Beyerlein, Frankenmuth, MI (US); Christian Ross, Hemlock, MI (US); Troy P. Strieter, Sebewing, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 84 days.

(21) Appl. No.: 12/550,033

(22) Filed: Aug. 28, 2009

(65) Prior Publication Data

US 2011/0050031 A1 Mar. 3, 2011

(51) Int. Cl.
*H02K 13/00* (2006.01)

(52) U.S. Cl. .......................................................... 310/242

(58) Field of Classification Search .................. 310/239, 310/242, 245–247

See application file for complete search history.

(56) References Cited

U.S. PATENT DOCUMENTS

| | | | | |
|---|---|---|---|---|
| 4,758,757 | A | 7/1988 | Okumura | |
| 5,114,351 | A * | 5/1992 | Hoffmann | 439/13 |
| 5,315,199 | A * | 5/1994 | McCracken et al. | 310/239 |
| 5,373,208 | A | 12/1994 | Ichimura et al. | |
| 5,453,646 | A | 9/1995 | Gleixner et al. | |
| 6,329,735 | B1 * | 12/2001 | Tanaka et al. | 310/239 |
| 6,809,455 | B2 | 10/2004 | Vaucher | |
| 2007/0085443 | A1 * | 4/2007 | Cutsforth | 310/239 |

FOREIGN PATENT DOCUMENTS

| | | | |
|---|---|---|---|
| JP | 2006-1746661 | A | 6/2006 |
| WO | 01/69760 | A1 | 9/2001 |

* cited by examiner

*Primary Examiner* — Dang Le

(74) *Attorney, Agent, or Firm* — Cantor Colburn LLP

(57) ABSTRACT

A method for reducing current and torque ripple in a brushed electric motor is disclosed. The motor includes a stator and a rotor. The stator includes a brush housing having a plurality of circumferentially spaced brushes disposed about a commutator, each brush having a contact face that is in electrical contact with the commutator, an opposed bias face and a peripheral wall, each brush disposed in a brush pocket having a pocket wall, a base and a bias spring that is configured to apply a contact force to the bias face, thereby urging the contact face into electrical contact with the commutator. The method includes inserting a damper between each pocket wall or respective base and the respective brush.

17 Claims, 10 Drawing Sheets

METHOD FOR REDUCING CURRENT AND TORQUE RIPPLE IN A BRUSHED ELECTRIC MOTOR AND MOTOR EMPLOYING THE SAME

BACKGROUND OF THE INVENTION

Brushed DC electric motors use a commutator and plurality of brushes for energizing the windings in the armature (rotor) of the motor. These brushes are mechanically biased against the commutator, such as by the action of a compressed spring. Variations in the brush drop, which is the voltage drop due to the brush and brush commutator interaction, as well as resonance of the sprung mass of the brushes in conjunction with rotation of the rotor and other external forces acting on the brushes, introduces current ripple in the motor current that in turn produces torque ripple in the torque output of the motor.

Vehicular electric power steering systems, including column-assist and rack-assist systems, may employ various types of electric motors, depending on the system requirements. Brushed DC electric motors are desirable to provide steering assist in certain electric power steering systems, particularly various column-assist systems where the motor output is mechanically linked to the steering hand wheel used by a vehicle operator to steer the vehicle. Torque ripple in the hand wheel of such steering systems is generally undesirable, since the torque ripple is directly communicated to the vehicle operator. Thus, torque ripple has limited the use of brushed DC motors for electric power steering systems applications, particularly column-assist steering systems. Therefore, it is desirable to reduce torque ripple in brushed DC electric motors to enhance their application and usefulness in electric power steering systems as well as other applications.

SUMMARY OF THE INVENTION

These and other advantages and features will become more apparent from the following description taken in conjunction with the drawings.

In an exemplary embodiment, a method for reducing current ripple in a brushed electric motor is disclosed. The motor includes a stator and a rotor. The stator includes a brush housing having a plurality of circumferentially spaced brushes disposed about a commutator, each brush having a contact face that is in electrical contact with the commutator, an opposed bias face and a peripheral wall, each brush disposed in a brush pocket having a pocket wall, a base and a bias spring that is configured to apply a contact force to the bias face, thereby urging the contact face into electrical contact with the commutator. The method includes inserting a damper between each pocket wall or respective base and the respective brush.

In another exemplary embodiment, a method of reducing torque ripple in an electric power steering system is provided. The electric power steering system includes a hand wheel that is mechanically linked to a brushed electric motor that is configured to provide an output torque to the handwheel. The motor includes a stator and a rotor. The stator includes a brush housing having a plurality of circumferentially spaced brushes disposed about a commutator, each brush having a contact face that is in electrical contact with the commutator, an opposed bias face and a peripheral wall, each brush disposed in a brush pocket having a pocket wall, a base and a bias spring that is configured to apply a contact force to the bias face, thereby urging the contact face into electrical contact with the commutator. The method includes inserting a damper between each pocket wall or respective base and the respective brush.

In yet another exemplary embodiment, a brushed electric motor is provided. The motor includes a rotor comprising a rotor shaft having an outer surface and a rotor axis, a commutator fixed to the surface of the rotor shaft and an armature that is axially spaced from and electrically connected to the commutator, the rotor rotatably disposed in a motor housing cover, an end of the rotor shaft extending through the cover. The motor also includes a stator comprising a brush housing having a plurality of circumferentially spaced brushes disposed about the commutator, each brush having a contact face that is in electrical contact with the commutator, an opposed bias face and a peripheral wall, each brush disposed in a brush pocket having a pocket wall, a base, a bias spring that is configured to apply a contact force to the bias face and thereby urge the contact face into electrical contact with the commutator, and a damper located between and in damping contact with the pocket wall or respective base and the respective brush, the brush housing configured for attachment to the housing cover, the stator also comprising a motor housing having a plurality of circumferentially spaced permanent magnets disposed on a cylindrical inner surface thereof that are configured to receive the armature and provide a corresponding plurality of magnet fields thereto, the rotor shaft being rotatably disposed on an other end of the shaft end to an end of the motor housing.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

A method for reducing current ripple in a brushed direct current (DC) electric motor is disclosed. The brushed motor includes a stator and a rotor. The stator includes a brush housing having a plurality of circumferentially spaced brushes disposed about a commutator, each brush having a contact face that is in electrical contact with the commutator, an opposed bias face and a peripheral wall, each brush disposed in a brush pocket having a pocket wall, a base and a bias spring that is configured to apply a contact force to the bias face, thereby urging the contact face into electrical contact with the commutator. The method includes inserting a damper between each pocket wall or respective base and the respective brush. The insertion of the dampers reduces variations in the brush drop, which is the voltage drop due to the brush and brush commutator interaction, as well as reducing resonance of the sprung mass of the brushes, both of which can occur in conjunction with the rotation of the rotor and the action of other external forces acting on the brushes, and can introduce variations in the amplitude of the motor current known as current ripple that in turn produces torque ripple in the torque output of the motor.

Figure 1:
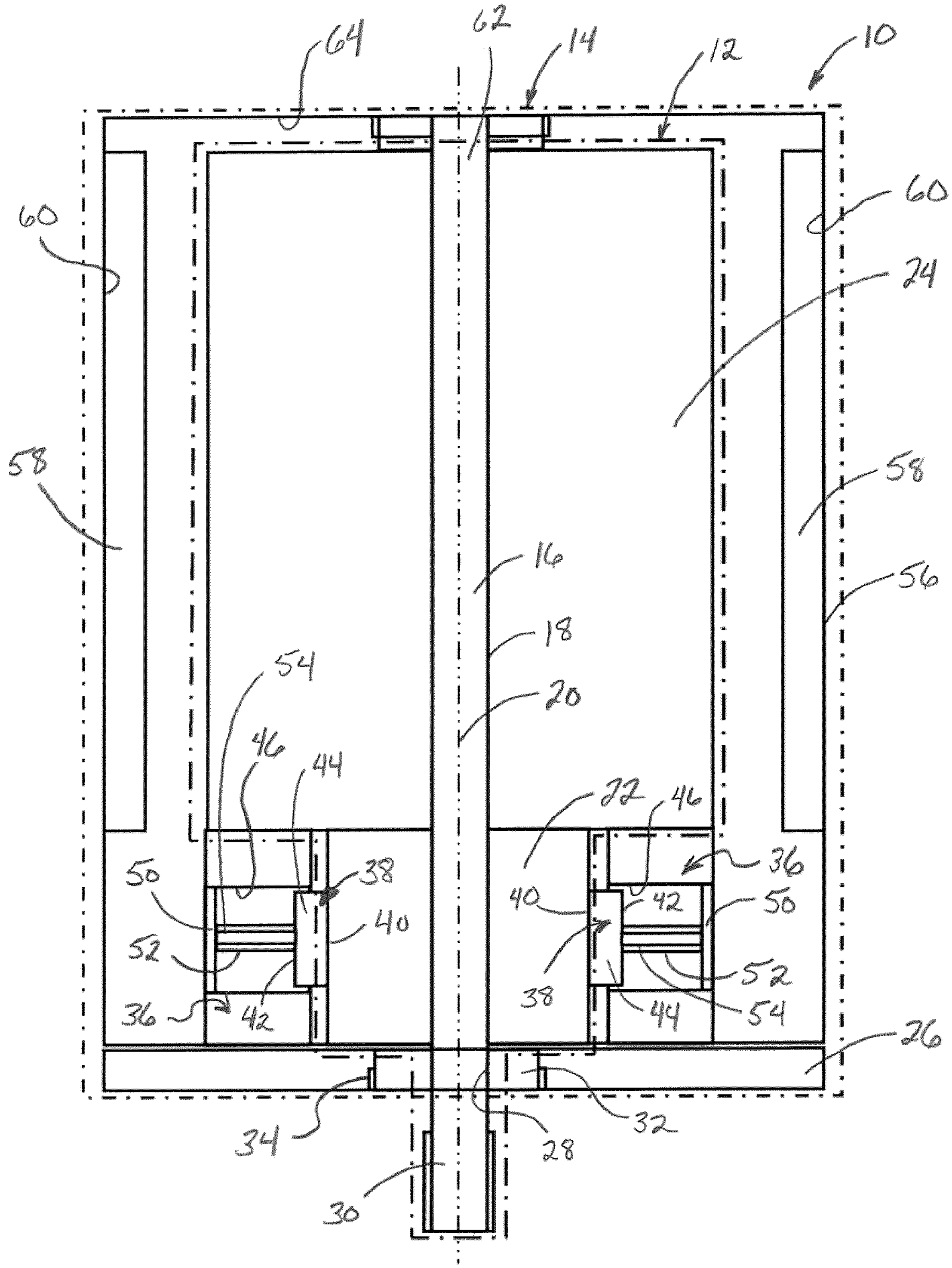
FIG. 1 is a schematic cross-section of an exemplary embodiment of a brushed DC motor as disclosed herein.

Referring to FIG. 1, a brushed DC electric motor 10 is schematically illustrated. Brushed electric motor 10 generally includes a rotor 12 and a stator 14. Rotor 12 includes several elements that are outlined in phantom. These include a rotor shaft 16 having an outer surface 18 and a rotor axis 20. Rotor 12 also includes a commutator 22 having a plurality of conventional conductive commutator segments (not shown) that are circumferentially spaced around and fixed to the outer surface 18 of the rotor shaft 16 for transmission of electrical current to an armature 24. Armature 24 includes a plurality of laminated cores and associated plurality of coil windings (not shown) and is axially spaced from and electrically connected to the commutator 22, and is also fixed to the outer surface 18 of the rotor shaft 16. Rotor 12 is rotatably disposed in motor housing cover 26, such as by passing rotor shaft 16 through an opening 28 in the cover so that an end 30 of the rotor shaft 16 extends through the cover. Rotor shaft 16 may be disposed in motor housing cover 26 through a bearing 32 that is fixed onto the outer surface 18 of rotor shaft 16, such as by pressing, and that is also fixed to motor housing cover 26, such as by being pressed into a bearing pocket 34 that is located over, and preferably concentrically with opening 28.

Figure 2:
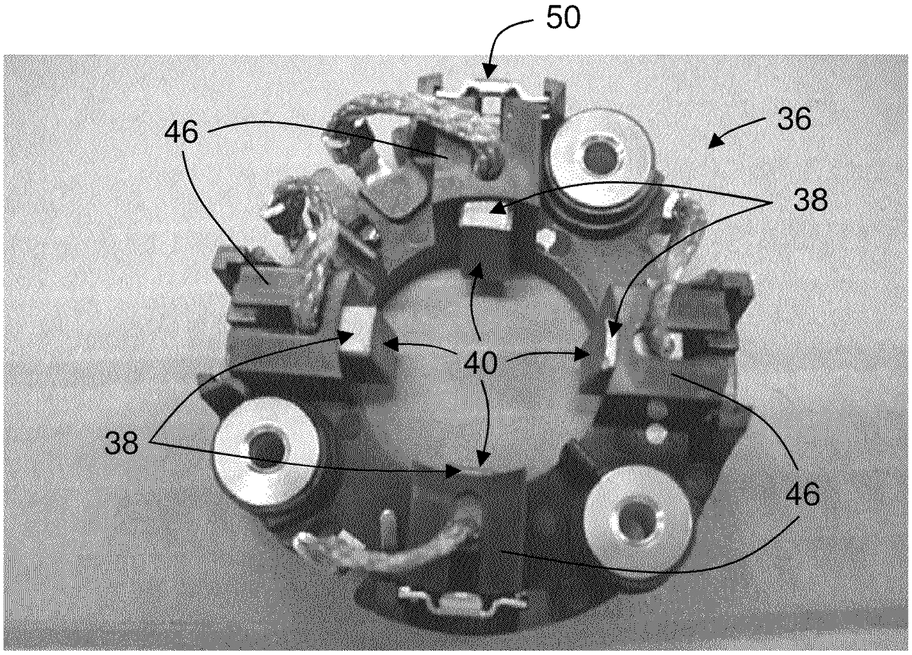
FIG. 2 is a top perspective view of an exemplary embodiment of a brush housing as disclosed herein.
Figure 3:
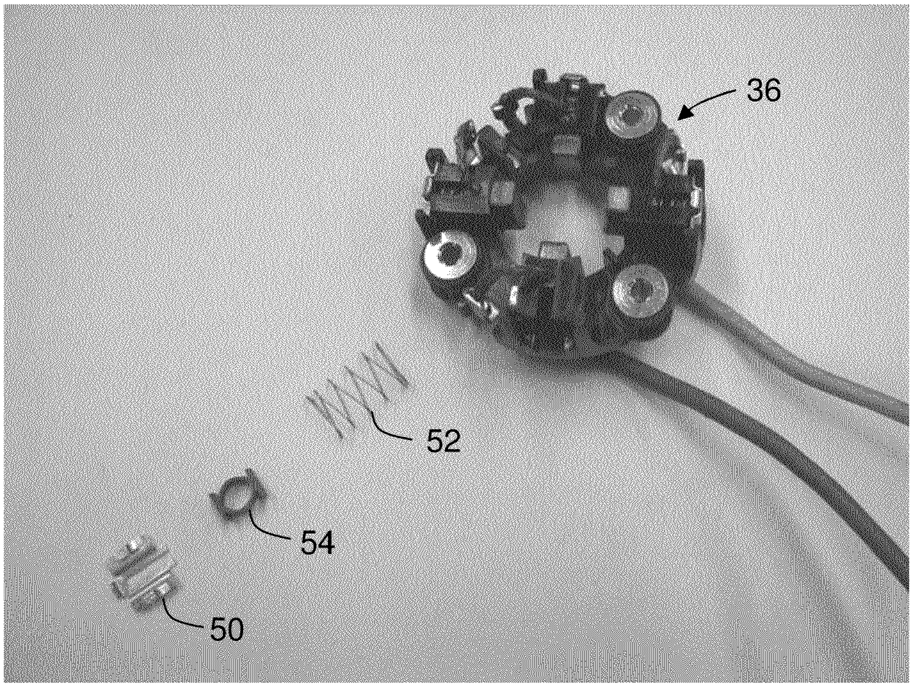
FIG. 3 is a partially exploded top perspective view of the brush housing of FIG. 2 and an exemplary embodiment of a spring-brush-damper assembly as disclosed herein.

Referring to FIGS. 1-3, brushed DC electric motor 10 also includes a stator 14 that also includes several elements that are outlined in phantom in FIG. 1. These include a brush housing 36 that has a plurality of circumferentially spaced brushes 38 that are disposed about commutator 22. Each brush 38 has a contact face 40 that is in electrical contact with the commutator 22. Each brush 38 has an opposed bias face 42 and a peripheral wall 44. Each brush is also disposed in a brush pocket 46 having a pocket wall 48, a base 50, a bias spring 52 that is configured to apply a contact force to the bias face 42 and thereby urge the contact face 40 into electrical contact with the commutator 22, and a damper 54 located between and in damping contact with the pocket wall 48 or respective base 50 and the respective brush 38. Damping contact is touching contact with the surfaces mentioned where the contact force with these surfaces is sufficient to couple a portion of the oscillatory energy that would otherwise produce current and torque ripple into the damper where it is attenuated. The brush housing 36 is configured for attachment to the motor housing cover 26. The stator 14 also includes a motor housing 56 having a plurality of circumferentially spaced permanent magnets 58 disposed on a cylindrical inner surface 60. The magnets 58 and inner surface 60 of the motor housing 56 are configured to receive the armature 24 and provide a corresponding plurality of magnetic fields thereto. The rotor shaft 16 is rotatably disposed on another or distal end 62 of the shaft to an end 64 of the motor housing 56.

Any suitable damper 54 may be located between and in damping contact with the pocket wall 48 or respective base 50 and the respective brush 38. In an exemplary embodiment, suitable dampers 54 may be characterized as a damping material configured to provide this damping contact and having a damping coefficient sufficient to reduce torque ripple by about 50% compared to torque ripple in the same undamped motor, and more particularly about 85%. In another exemplary embodiment, the damper 54 has a damping coefficient of about 0.212 N-s/m to about 0.382 N-s/m. Suitable dampers 54 include a resilient damper 66 configured to provide damping contact and inserted between the base 50 and the bias face 42 in each brush pocket 46. In an exemplary embodiment, bias spring 52 includes a coil spring 68, such as those having circular, rectangular (not shown), rounded rectangle and other cross-sectional profiles, and inserting a resilient damper 66 in damping contact between the base 50 and the bias face 42 comprises locating the resilient damper 66 within a plurality of coils of the coil spring 68. The resilient damper may have any suitable size and shape.

Figure 4:
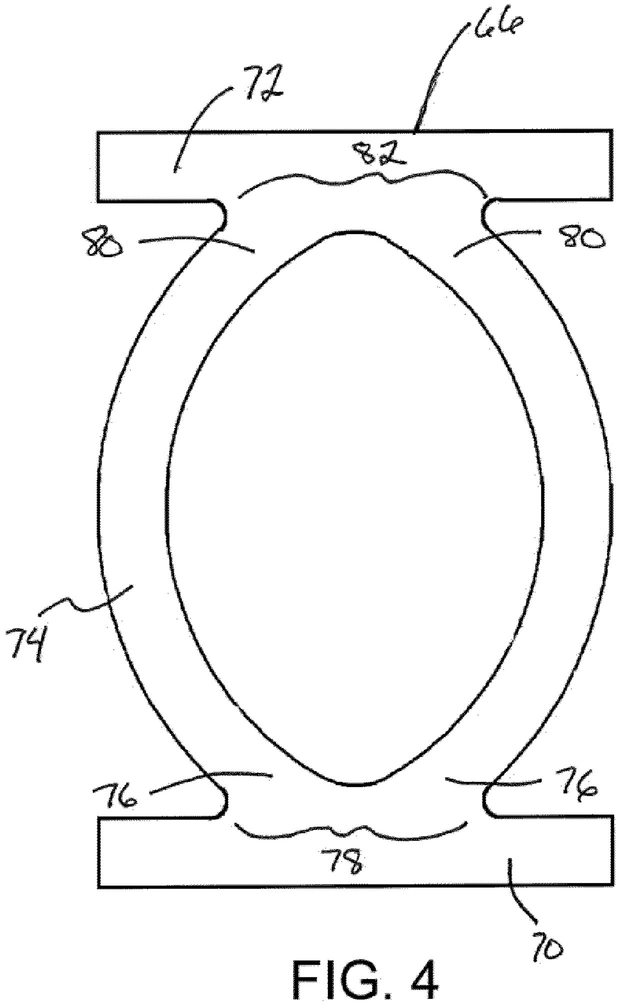
FIG. 4 is a front view of an exemplary embodiment of a resilient damper as disclosed herein.
Figure 5:
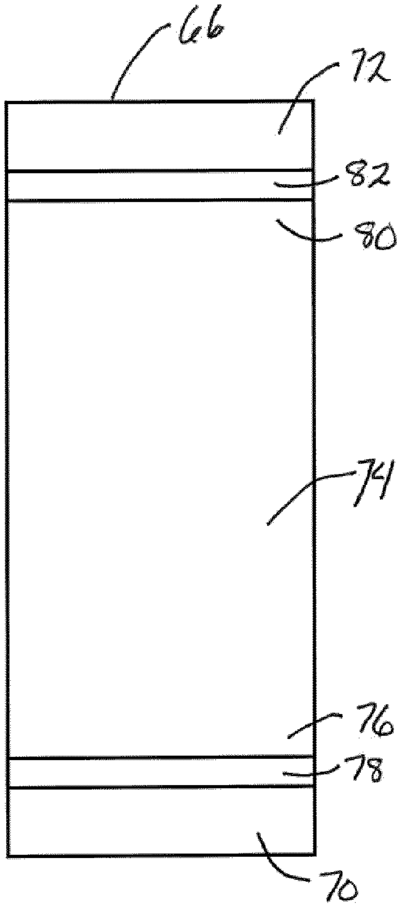
FIG. 5 is a side view of the damper FIG. 4.

Referring to FIGS. 4 and 5, in another exemplary embodiment, resilient damper 66 includes a resilient base 70, a resilient cap 72 that is spaced from and substantially parallel to the base, and a pair of opposed outwardly convex resilient ribs 74. Each rib 74 has a proximal end 76 joined to a central portion 78 of the base 70 and a distal end 80 joined to a central portion 82 of the cap 72. Base 70 and cap 72 may have any suitable shape, and particularly may be selected to fit within the coil spring 68. They may also have the same shape as the cross-sectional profile of the coil spring 68. In yet another exemplary embodiment, coil spring 68 has a substantially rectangular coil profile (not shown) and the resilient damper 66 includes a base 70 and cap 72, where each comprises a rectangular prism and a pair of opposed outwardly convex opposed ribs, each rib having a proximal end joined to a central portion of the base 70 and a distal end that is joined to a central portion of the cap 72. Resilient damper 66 may be made from any suitable resilient material that will provide the desired damping, including, in an exemplary embodiment, materials that have a damping coefficient of about 0.212 N-s/m to about 0.382 N-s/m. In one exemplary embodiment, a suitable resilient material includes an elastomer or a plastic, or a combination thereof. Examples of suitable elastomers include natural or synthetic rubbers. In one exemplary embodiment, the base 70, cap 72 and ribs 74 comprise an integral component, such as an integrally molded component.

Referring to FIG. 5, resilient damper 66 may include at least two resilient shims 84 in opposing relation and wedged between the peripheral wall 44 of the brush 38 and the pocket wall 48 in each brush pocket 46. The term wedged is used to indicate that the shims are in damping contact as described herein, and is not intended to indicate action required to wedge the shims 84 into this position, although this mode of wedging the shims is within the scope of this disclosure. The shims 84 may be applied to either or both of the peripheral wall 44 or pocket wall 48, such as with the use of adhesives prior to inserting the brushes 38 into the brush pockets 46. The shims 84 may also be integrally formed into either or both of the peripheral wall 44 or pocket wall 48, as protrusions or protuberances therefrom. In one exemplary embodiment, the brushes 38 have a length that is greater than their width, and are oriented in brush housing 36 so that their length is parallel to the rotor axis 20 and the shims 84 are placed across the width of brushes 38. Resilient shims 84 may be formed from any suitable resilient material, including, in an exemplary embodiment, an elastomer or a plastic, or a combination thereof. In one exemplary embodiment, a suitable material includes an elastomer or a plastic, or a combination thereof. Examples of suitable elastomers include natural or synthetic rubbers.

Figure 6:
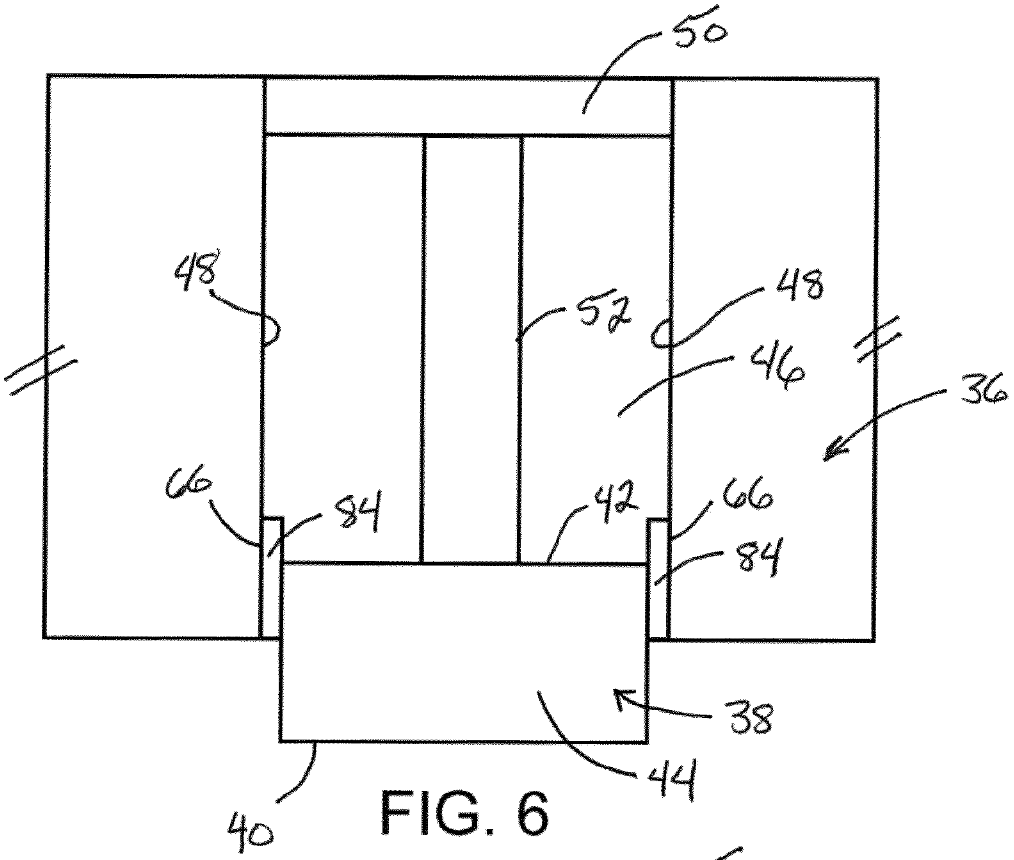
FIG. 6 is a schematic illustration of another exemplary embodiment of a spring-brush-damper assembly as disclosed herein.
Figure 7:
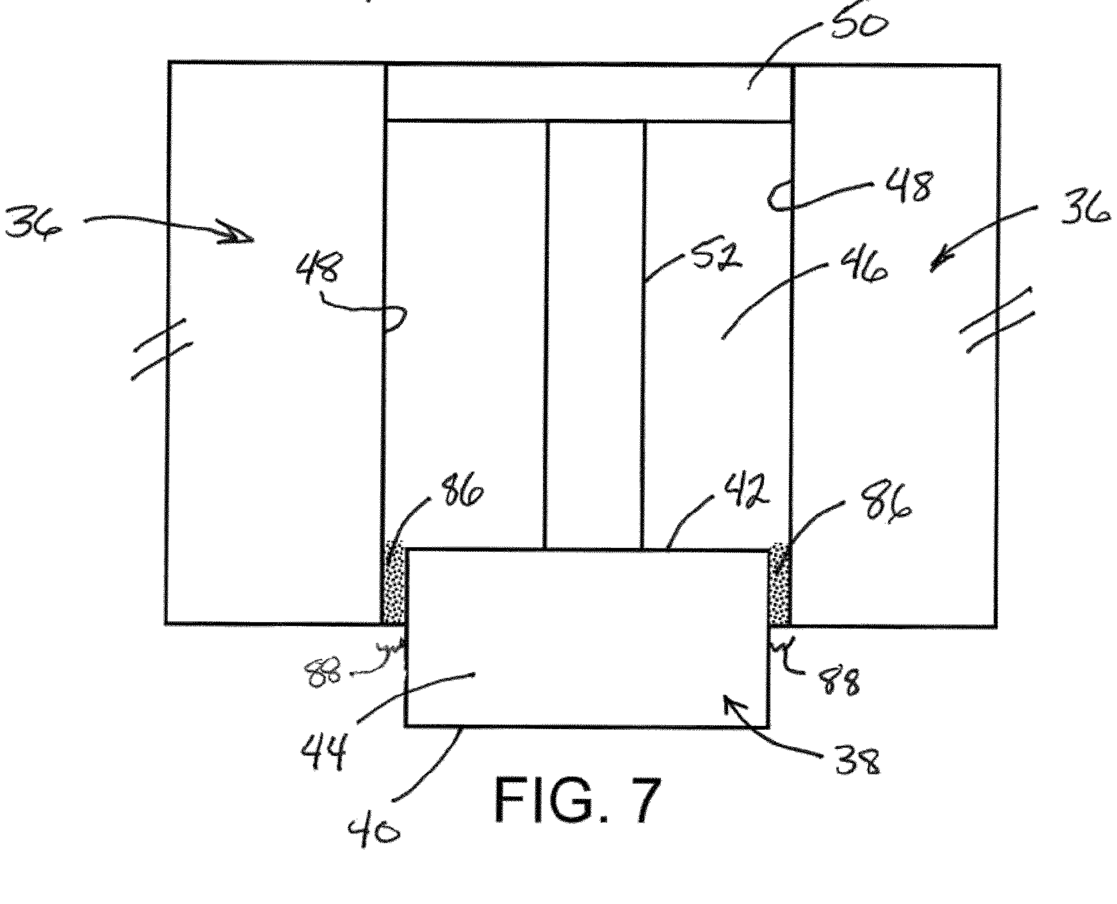
FIG. 7 is a schematic illustration of another exemplary embodiment of a spring-brush-damper assembly as disclosed herein.

Referring to FIG. 6, resilient damper 66 may include a damping grease 86 filling at least a portion of a gap 88 between the peripheral wall 44 of the brush 38 and the pocket wall 48 in each brush pocket 46. In one exemplary embodiment, the damping grease 86 may be disposed so as to be located entirely around either or both of peripheral wall 44 of the brush 38 or the pocket wall 48 in each brush pocket 46. Damping grease 86 may be disposed uniformly so that it tends to establish or maintain gap 88. In another exemplary embodiment, damping grease may be disposed in opposing relation between the peripheral wall 44 of the brush 38 and the pocket wall 48 in each brush pocket 46, analogous to the use of shims 84. In one exemplary embodiment, the brushes 38 have a length that is greater than their width, and are oriented in brush housing 36 so that their length is parallel to the rotor axis 20 and the grease 86 is placed across the width of brushes 38. Damping grease may be formed from any suitable non-melting grease, having a shear resistance that is stable over the operating temperature range of the motor, including, for example, from about −40° F. to about 125° F. Damping grease 86 may comprise a combination of a synthetic base oil, such as, for example, an alkylated naphthalene, perfluoropolyether, polyalphaolefin, polyglycol, polyphenylether, silicone, or synthetic ester, or a combination thereof, together with a gellant, such as, for example, organic soaps, non-organic soaps and various inorganic materials. Organic soaps include lithium, lithium complex, sodium, sodium complex, calcium, calcium complex or aluminum complex, or a combination thereof. Non-organic soaps include urea. Inorganic materials include bentonite clay, silica, polytetrafluoroethylene (PTFE) and metal oxides. Grease 86 may also include various property additives, including antioxidants, antiwear, antirust, anti-corrosion, filler, fortifier, lubricity, viscosity modifier, pour point modifier and dye additives.

The resilient damper 66 may also include a combination of one or more dampers, including a combination of one or more embodiments of the dampers described herein.

Figure 8:
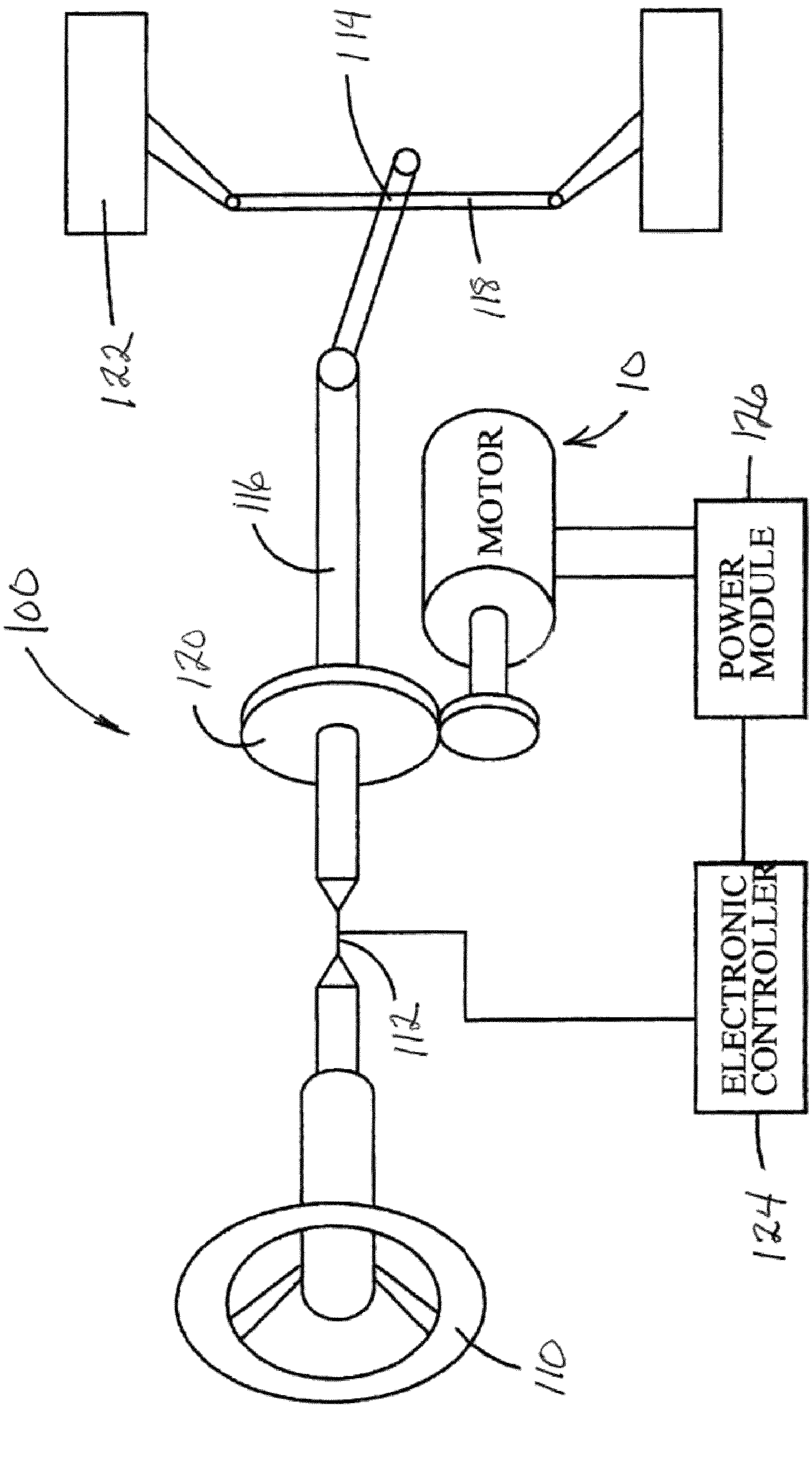
FIG. 8 is a schematic illustration of an exemplary embodiment of an exemplary embodiment of an electric power steering system and brushed motor as disclosed herein.

Referring to FIGS. 1 and 8, in an exemplary embodiment, motor 10 having resilient dampers 66 as described herein may be used to reduce torque ripple in an electric power steering (EPS) system 100. In a typical EPS system 100, shown schematically in FIG. 8, (FIG. 8 shows a column-mounted or column-assist EPS system) the steering assist torque is provided by an electronically controlled motor 10 in the amount demanded by the driver's use of the steering hand wheel 110. The driver's need for torque assistance is sensed and communicated to the motor controller by an in-line torque sensor 112. The assist torque is transmitted to the wheels via the conventional rack-pinion assembly 114, usually by applying the torque to the steering column 116, though it is also known to apply torque to the rack 118 directly. To help with motor packageability, reduction gears 120 are typically placed at the motor shaft. A mechanical link is maintained between the steering hand wheel and the vehicle wheels 122 for safe manual operation in case of failure of the EPS system. An electronic controller 124 and power module 126 complete the general elements of EPS system 100. The reduction of torque ripple in motor 10, as described herein, is particularly advantageous for use in EPS system 100 because any torque ripple from electric motor 10 is transmitted directly by the mechanical linage described to a vehicle operator, which is very undesirable, as described herein. Thus, employment of the method of reducing torque ripple in motor 10 enhances the suitability of this motor as the drive motor for EPS system 100. This is a significant benefit, since brushed electric motors have previously been considered as unsuitable or undesirable for many EPS applications, due to the undesirable levels of current ripple and associate torque ripple associated with brushed motors.

The methods described herein are also particularly advantageous because they can be employed not only to reduce torque ripple in future electric motors that are not yet in production, or which have not yet been designed, but they may also be employed to incorporate dampers into motors that have already been designed, or which have already been produced. For example, existing motors may be disassembled to provide access to the brushes, and resilient dampers of the types described herein may be added. The motors may then be reassembled and the reduction of torque ripple and associated benefits described herein may be realized.

EXAMPLES

Figure 9:
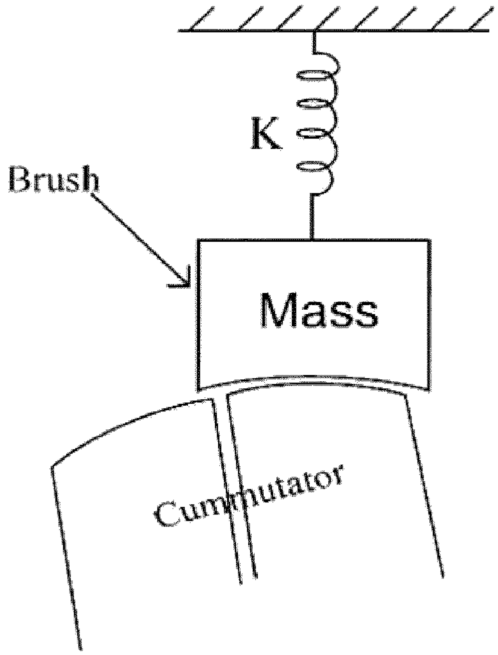
FIG. 9 Related Art
FIG. 9 is an schematic illustration of the spring-mass system of a related art spring brush combination.

The usefulness of the methods for reducing current and torque ripple described herein and the associated brushed electric motors were verified by bench testing using EPS motors form a column-assist EPS system employed in a production vehicle. FIG. 9 schematically illustrates the original mass (brush)-spring configuration of a prior art brushed motor. The brush is unstable, and vibrates with a natural frequency ($\omega_n$) for an impulse input. The natural frequency of the mass-spring is given in equation 1 derived from its transfer function (H(s)) as shown in equation 2 below:

$$\omega_n = \sqrt{k/m} \tag{1}$$

$$H(s) = \frac{1}{s^2 + \omega_n^2} = \frac{1/m}{s^2 + k/m} \tag{2}$$

where k (N/m) is the spring constant (stiffness), m (Kg) is the mass of the brush and s is frequency domain.

Figure 10:
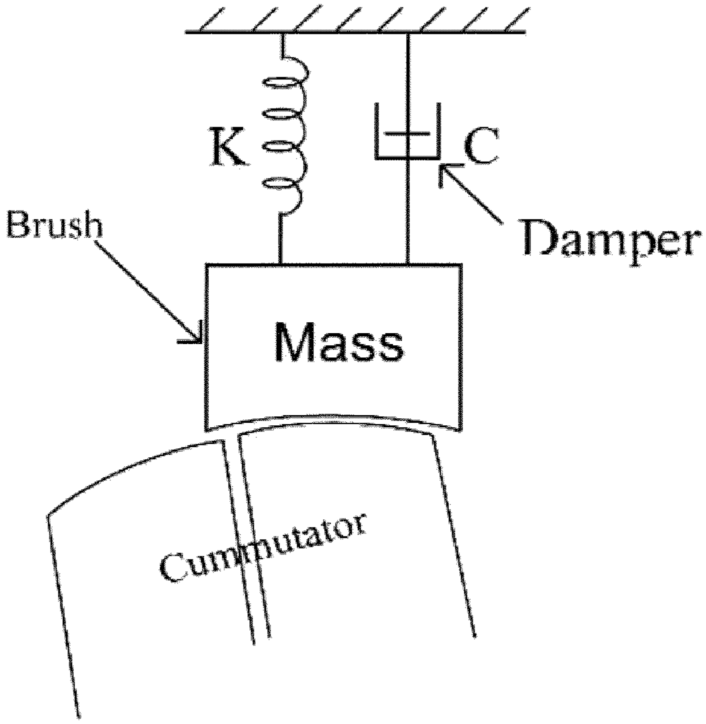
FIG. 10 is an schematic illustration of a spring-mass-damper system of an exemplary embodiment of a spring-brush-damper combination as disclosed herein.

FIG. 10 schematically illustrates the general mass (brush)-spring-damper configuration for the brushed motor of the invention that includes the resilient damper, shims or damping grease described herein. The damping frequency ($\omega_d$) of this configuration is given in equation 3, which is in turn derived from the transfer function (H(s)) of the mass (brush)-spring-damper of equation 4, as shown below:

$$\omega_d = \sqrt{k/m - (c/2m)^2} \quad (3)$$

$$H(s) = \frac{1}{s^2 + 2\zeta w_n s + w_n^2} = \frac{1/m}{s^2 + c/ms + k/m} \quad (4)$$

where c is the damping coefficient (N-s/m) and $\zeta$ is the unitless damping ratio.

In the bench testing, resilient rubber dampers having the configurations illustrated in FIGS. 4 and 5 as well as rubber shims having the configuration shown in FIG. 6 were employed. Electric motors having no dampers were run and the current and torque ripple performance was evaluated and recorded. The dampers were then inserted as described herein, and the current and torque ripple performance of the motors was reevaluated and recorded. The motors included four rectangular prism shaped brushes having a length that was greater than the width, where the length of the brushes were aligned parallel to the rotor axis.

Figure 11:
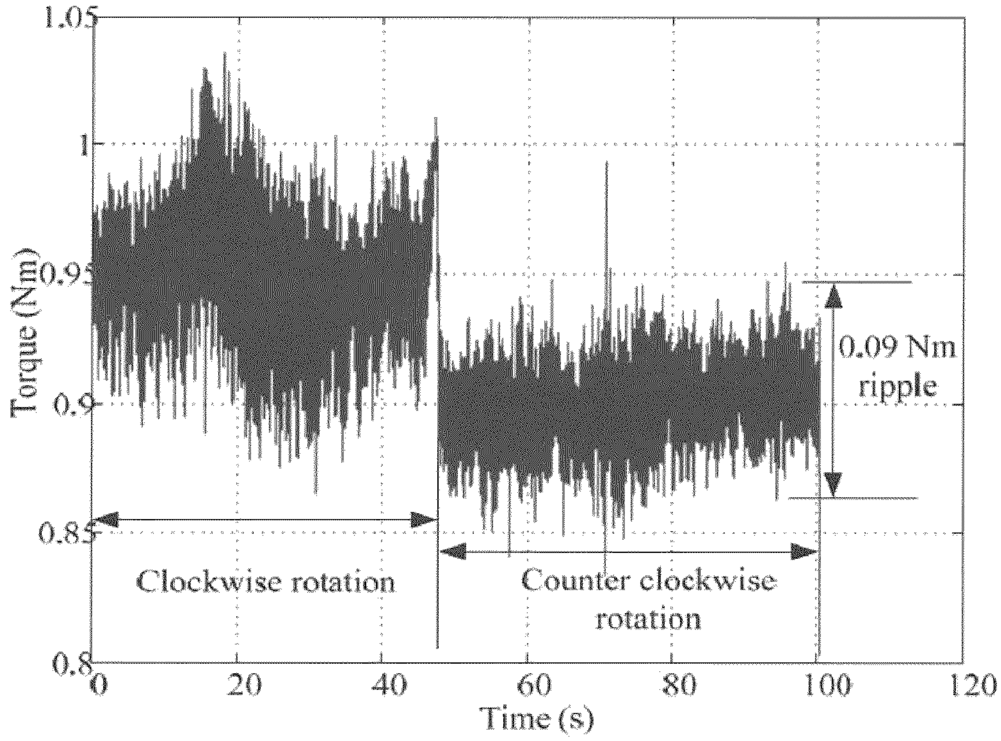
FIG. 11 Related Art
FIG. 11 is a plot of motor torque as a function of time for a related art brushed DC electric motor.
Figure 12:
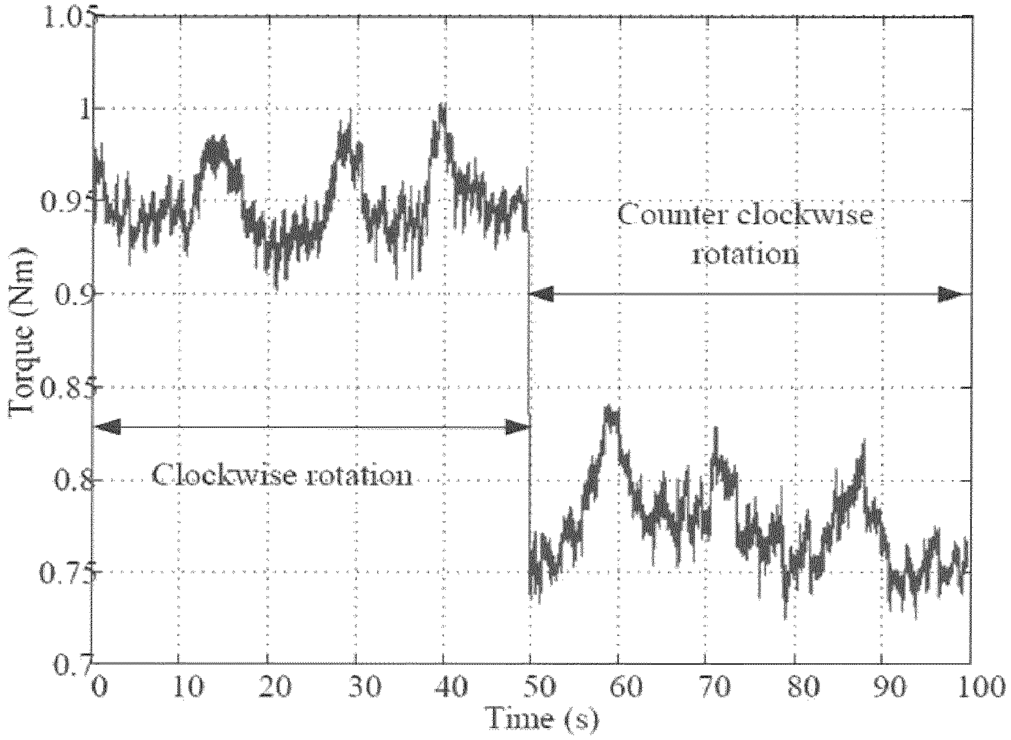
FIG. 12 is a plot of motor torque as a function of time for an exemplary embodiment of a brushed DC electric motor having an exemplary embodiment of a resilient damper located within the spring as disclosed herein.
Figure 13:
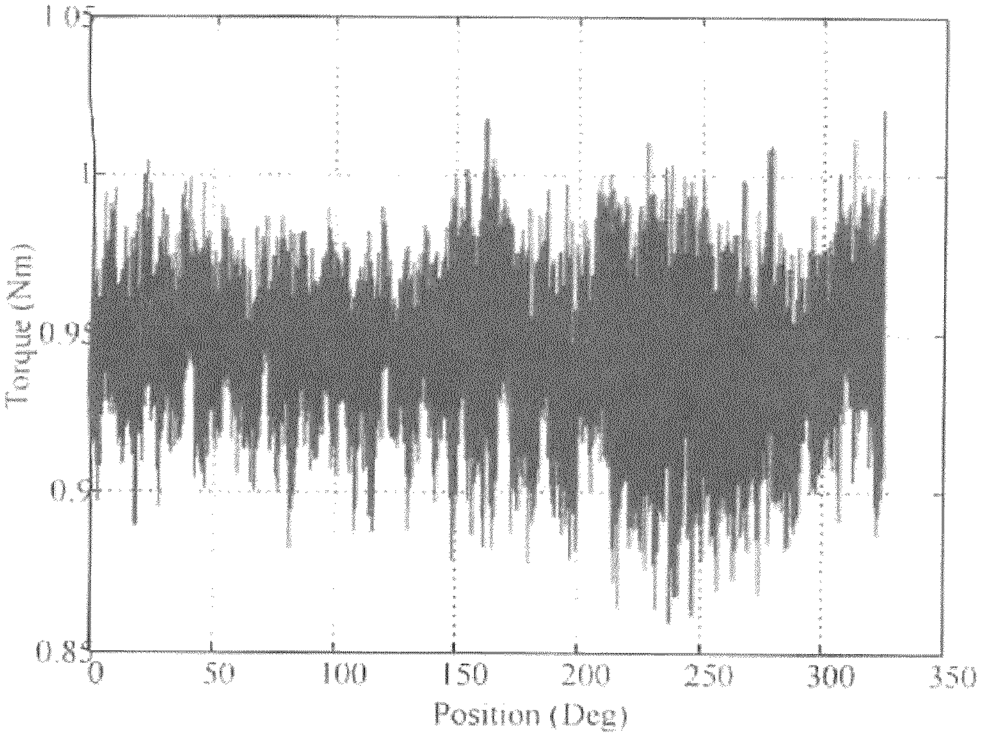
FIG. 13 Related Art
FIG. 13 is a plot of motor torque as a function of shaft position for a related art brushed DC electric motor.
Figure 14:
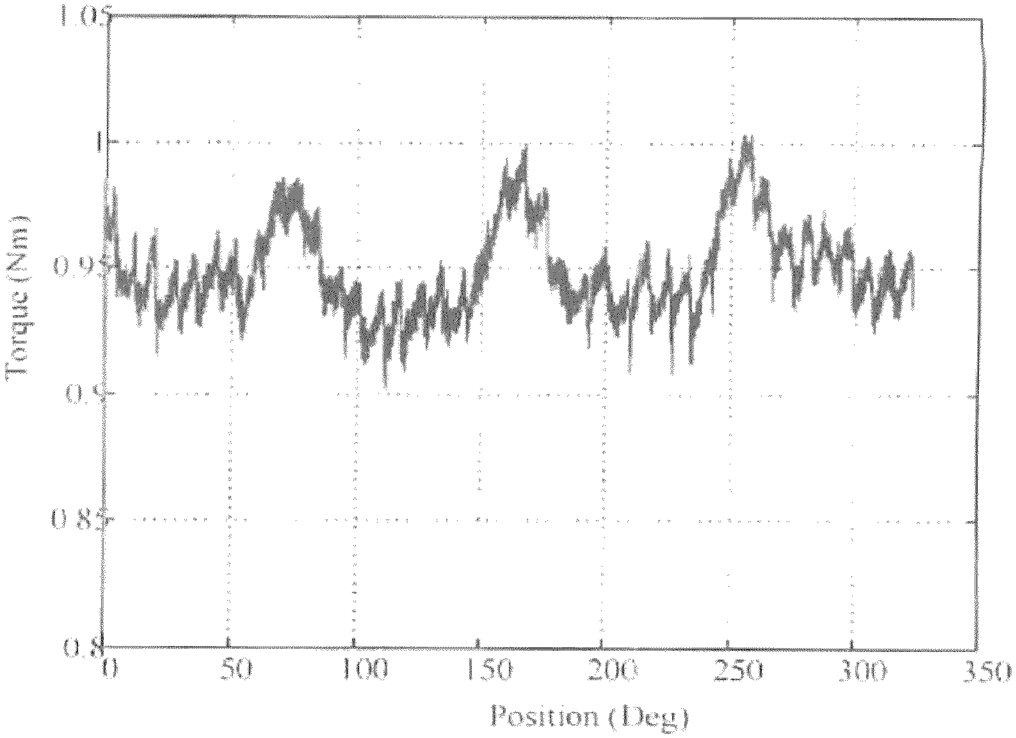
FIG. 14 is a plot of motor torque as a function of shaft position for an exemplary embodiment of a brushed DC electric motor having an exemplary embodiment of a resilient damper located within the spring as disclosed herein.
Figure 15:
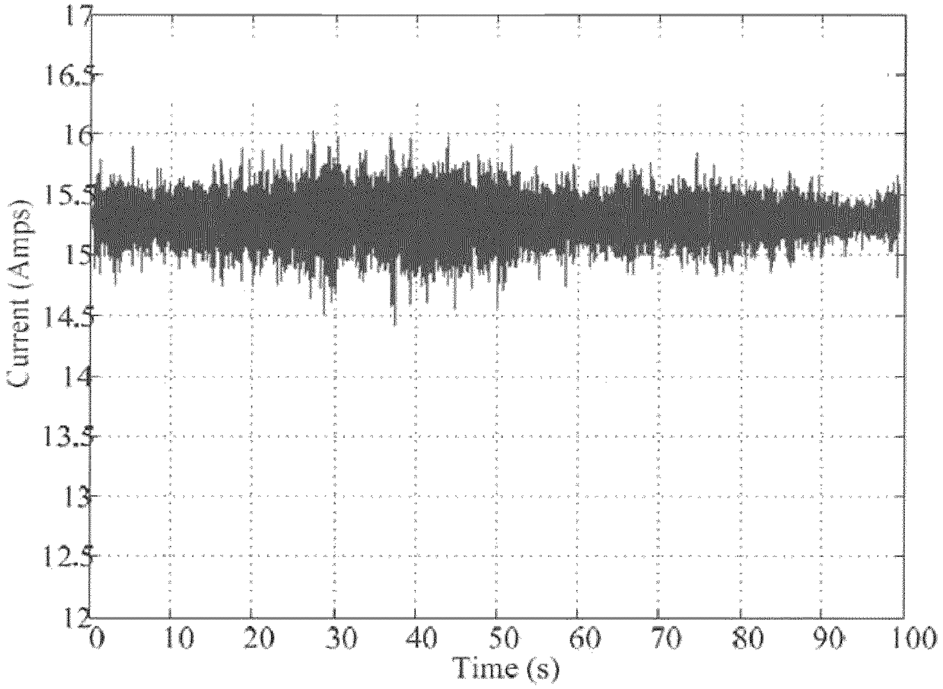
FIG. 15 Related Art
FIG. 15 is a plot of motor current as a function of time for a related art brushed DC electric motor.
Figure 16:
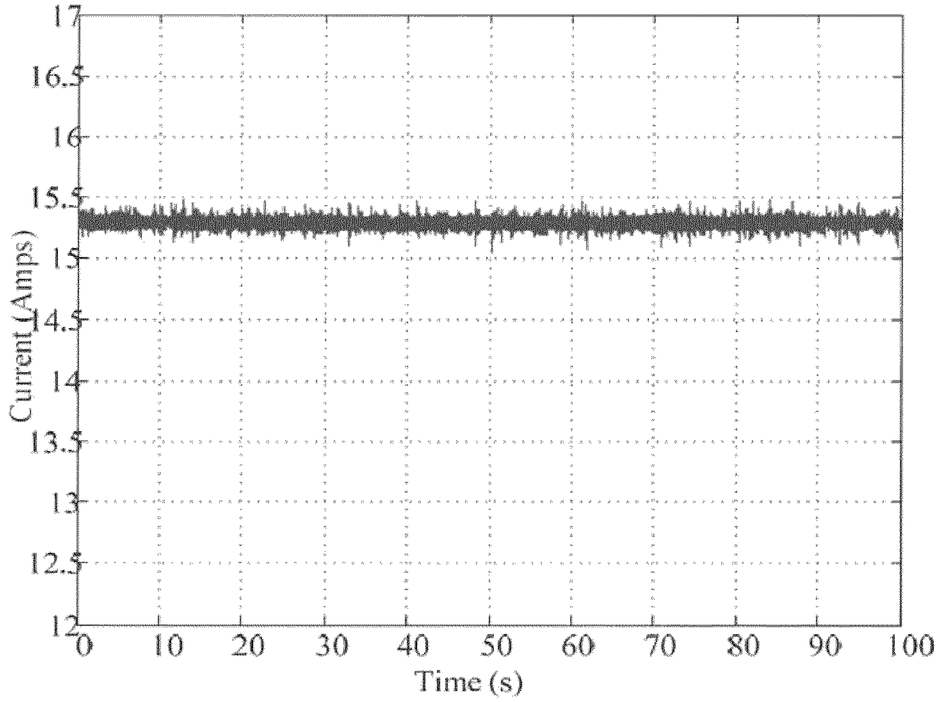
FIG. 16 is a plot of motor current as a function of time for an exemplary embodiment of a brushed DC electric motor having an exemplary embodiment of a resilient damper located within the spring as disclosed herein.
Figure 17:
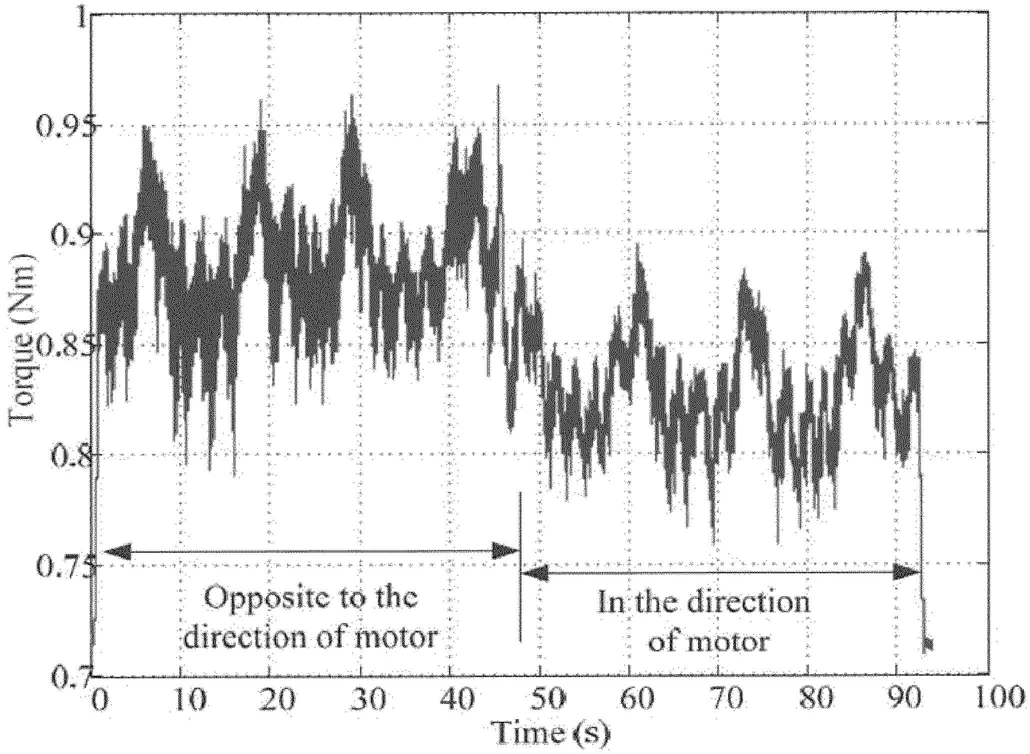
FIG. 17 is a plot of motor torque as a function of time for an exemplary embodiment of a brushed DC electric motor having an exemplary embodiment of a resilient damper comprising shims as disclosed herein.
Figure 18:
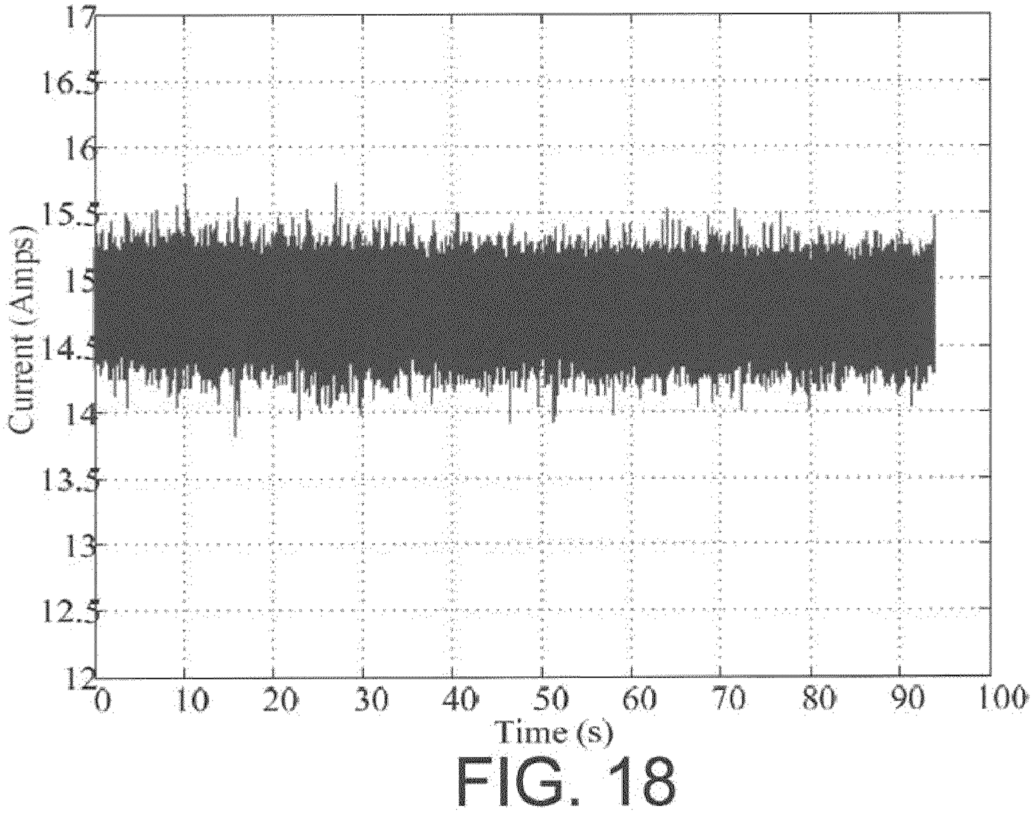
FIG. 18 is a plot of motor current as a function of time for an exemplary embodiment of a brushed DC electric motor having an exemplary embodiment of a resilient damper comprising shims as disclosed herein

The results of torque as a function of time and torque as a function of position measurements are shown in FIGS. 11-14 that show the reduction of the torque ripple caused due to brush vibration and chattering. FIGS. 11 and 12, respectively, illustrate motor torque as a function of time both before and after damping is introduced into the brushed motor. FIGS. 13 and 14, respectively, illustrate motor torque as a function of position before and after damping the brushed motor. The torque ripple was reduced from about 0.1 Nm to less than about 0.015 Nm, which is a reduction in torque ripple of 85% reduction. The results confirm that placing a resilient damper in conjunction with the spring significantly reduces the torque ripple due to the brushes. FIGS. 15 and 16 illustrate motor current of the motor using undamped springs and with a resilient damper placed within the spring. A similar reduction of current ripple in the motors with the damped springs may be observed. FIGS. 17 and 18 illustrate the torque ripple and current ripple responses, respectively, for a motor that included rubber shims inserted between the pocket wall and peripheral wall of the brushes. The torque ripple reduction was somewhat less than the reduction achieved with resilient dampers that were placed within the springs, but were significantly reduced in comparison with the motors having the undamped spring configurations.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A method for reducing current ripple in a brushed electric motor comprising a stator and a rotor, the stator comprising a brush housing having a plurality of circumferentially spaced brushes disposed about a commutator, each brush having a contact face that is in electrical contact with the commutator, an opposed bias face and a peripheral wall, each brush disposed in a brush pocket having a pocket wall, a base and a bias spring that is configured to apply a contact force to the bias face, thereby urging the contact face into electrical contact with the commutator, comprising:

inserting a resilient damper within each said brush pocket and the respective brush disposed within said brush pocket, said resilient damper configured to provide a damping coefficient between said brush pocket and said respective brush, wherein inserting a resilient damper comprises placing said resilient damper in damping contact between the base and the bias face in each brush pocket, placing grease between the peripheral wall of the brushes and the pocket wall in each brush pocket or placing at least two shims in opposing relation and wedged between the peripheral wall and the pocket wall in each brush pocket, or a combination thereof wherein each bias spring comprises a coil spring and inserting a resilient damper in damping contact between the base and the bias face comprises locating the resilient damper within a plurality of coils of the coil spring.

2. The method of claim 1, wherein inserting a resilient damper comprises placing said resilient damper in damping contact between the base and the bias face in each brush pocket, placing grease between the peripheral wall of the brushes and the pocket wall in each brush pocket or placing at least two shims in opposing relation and wedged between the peripheral wall and the pocket wall in each brush pocket, or a combination thereof.

3. The method of claim 1, wherein each resilient damper comprises a resilient base, a resilient cap that is spaced from and substantially parallel to the base, and a pair of opposed outwardly convex resilient ribs, each rib having a proximal end joined to a central portion of the base and a distal end joined to a central portion of the cap.

4. The method of claim 1, wherein the resilient damper comprises a base and cap, said base and said cap each being a rectangular prism and connected by a pair of opposed outwardly convex opposed ribs, each rib having a proximal end joined to a central portion of the base and a distal end that is joined to a central portion of the cap.

5. The method of claim 4, wherein the base, cap and ribs comprise an integral component.

6. The method of claim 5, wherein the integral component comprises an elastomer or a plastic.

7. The method of claim 1, wherein the damper provides a damping coefficient of about 0.212 N-s/m to about 0.382 N-s/m.

8. A method of reducing torque ripple in an electric power steering system comprising a hand wheel that is mechanically linked to a brushed electric motor that is configured to provide an output torque to the handwheel, the brushed electric motor comprising a stator and a rotor, the stator comprising a brush housing having a plurality of circumferentially spaced brushes disposed about a commutator, each brush having a contact face that is in electrical contact with the commutator, an opposed bias face and a peripheral wall, each brush disposed in a brush pocket having a pocket wall, a base and a bias spring that is configured to apply a contact force to the bias face, thereby urging the contact face into electrical contact with the commutator, comprising:

inserting a damper within each said brush pocket and the respective brush disposed within said brush pocket wherein each bias spring comprises a coil spring and inserting a resilient damper in damping contact between the base and the bias face comprises locating the resilient damper within a plurality of coils of the coil spring.

9. The method of claim 8, wherein inserting the damper comprises placing a resilient damper in damping contact between the base and the bias face in each brush pocket, placing grease between the peripheral wall of the brushes and the pocket wall in each brush pocket or placing at least two shims in opposing relation and wedged between the peripheral wall and the pocket wall in each brush pocket, or a combination thereof.

10. The method of claim 9, wherein the damper provides a damping coefficient in the range of about 0.212 N-s/m to about 0.382 N-s/m.

11. The method of claim 8, wherein the electric power system comprises a column assist steering system.

12. A method of reducing torque ripple in an electric power steering system comprising a hand wheel that is mechanically linked to a brushed electric motor that is configured to provide an output torque to the handwheel, the brushed electric motor comprising a stator and a rotor, the stator comprising a brush housing having a plurality of circumferentially spaced brushes disposed about a commutator, each brush having a contact face that is in electrical contact with the commutator, an opposed bias face and a peripheral wall, each brush disposed in a brush pocket having a pocket wall, a base and a bias spring that is configured to apply a contact force to the bias face, thereby urging the contact face into electrical contact with the commutator, comprising:

inserting a damper within each said brush pocket and the respective brush disposed within said brush pocket, wherein inserting the damper comprises placing resilient damper in damping contact between the base and the bias face in each brush pocket, placing grease between the peripheral wall of the brushes and the pocket wall in each brush pocket or placing at least two shims in opposing relation and wedged between the peripheral wall and the pocket wall in each brush pocket, or a combination thereof, wherein each resilient damper comprises a resilient base, a resilient cap that is spaced from and substantially parallel to the base, and a pair of opposed outwardly convex resilient ribs, each rib having a proximal end joined to a central portion of the base and a distal end joined to a central portion of the cap.

13. The method of claim 12, wherein the base, cap and ribs comprise an integral component.

14. A method of reducing torque ripple in an electric power steering system comprising a hand wheel that is mechanically linked to a brushed electric motor that is configured to provide an output torque to the handwheel, the brushed electric motor comprising a stator and a rotor, the stator comprising a brush housing having a plurality of circumferentially spaced brushes disposed about a commutator, each brush having a contact face that is in electrical contact with the commutator, an opposed bias face and a peripheral wall, each brush disposed in a brush pocket having a pocket wall, a base and a bias spring that is configured to apply a contact force to the bias face, thereby urging the contact face into electrical contact with the commutator, comprising:

inserting a damper within each said brush pocket and the respective brush disposed within said brush pocket, wherein inserting the damper comprises placing a resilient damper in damping contact between the base and the bias face in each brush pocket, placing grease between the peripheral wall of the brushes and the pocket wall in each brush pocket or placing at least two shims in opposing relation and wedged between the peripheral wall and the pocket wall in each brush pocket, or a combination thereof, wherein the resilient damper comprises a base and cap, said base and said cap each being a rectangular prism and connected by a pair of opposed outwardly convex opposed ribs, each rib having a proximal end joined to a central portion of the base and a distal end that is joined to a central portion of the cap.

15. The method of claim 14, wherein the integral component comprises an elastomer or a plastic.

16. A brushed electric motor, comprising:

a rotor comprising a rotor shaft having an outer surface and a rotor axis, a commutator fixed to the surface of the rotor shaft and an armature that is axially spaced from and electrically connected to the commutator, the rotor rotatably disposed in a motor housing cover, an end of the rotor shaft extending through the cover;

a stator comprising a brush housing having a plurality of circumferentially spaced brushes disposed about the commutator, each brush having a contact face that is in electrical contact with the commutator, an opposed bias face and a peripheral wall, each brush disposed in a brush pocket having a pocket wall, a base, a bias spring that is configured to apply a contact force to the bias face and thereby urge the contact face into electrical contact with the commutator, and a damper located within said brush pocket, the brush housing configured for attachment to the housing cover, the stator also comprising a motor housing having a plurality of circumferentially spaced permanent magnets disposed on a cylindrical inner surface thereof that are configured to receive the armature and provide a corresponding plurality of magnetic fields thereto, the rotor shaft being rotatably disposed on an other end of the shaft end to an end of the motor housing, wherein the bias spring comprises a coil spring and the damper comprises a base and cap, said base and said cap being a rectangular prism and connected by a pair of opposed outwardly convex opposed ribs, each rib having a proximal end joined to a central portion of the base and a distal end that is joined to a central portion of the cap, wherein each of the base, cap and ribs comprises an elastomer or a plastic.

17. The brushed electric motor of claim 16, wherein the damper comprises a resilient damper in damping contact between the base and the bias face in each brush pocket, damping grease filling at least a portion of a gap between the peripheral wall of the brushes and the pocket wall in each brush pocket or at least two shims in substantially opposing relation wedged between the peripheral wall and the pocket wall in each brush pocket, or a combination thereof.

* * * * *